United States Patent [19]

Bassett

[11] Patent Number: 5,542,362

[45] Date of Patent: Aug. 6, 1996

[54] APPARATUS FOR CONTINUOUSLY PLANTING SEED AND APPLYING A SOIL ADDITIVE

[75] Inventor: James H. Bassett, Sycamore, Ill.

[73] Assignee: Dawn Equipment Company, Sycamore, Ill.

[21] Appl. No.: 143,075

[22] Filed: Oct. 25, 1993

Related U.S. Application Data

[63] Continuation-in-part of Ser. No. 926,046, Aug. 5, 1992, abandoned.

[51] Int. Cl.$^6$ .................................................. A01C 23/00
[52] U.S. Cl. ........................... 111/120; 111/52; 111/140
[58] Field of Search ..................... 111/81, 85, 118, 111/156, 123, 52, 120, 124, 139, 140, 141, 142, 200, 14

[56] References Cited

U.S. PATENT DOCUMENTS

| | | | |
|---|---|---|---|
| 2,058,539 | 10/1936 | Welty et al. | 111/156 |
| 3,188,989 | 6/1965 | Johnston | 11/123 |
| 3,447,495 | 6/1969 | Miller et al. | 111/123 X |
| 3,701,327 | 10/1972 | Krumholz | 111/81 |
| 4,055,126 | 10/1977 | Brown et al. | 111/85 |
| 4,129,082 | 12/1978 | Betulius | 111/123 |
| 4,550,122 | 10/1985 | David et al. | 111/140 X |
| 4,762,075 | 8/1988 | Halford | 111/140 X |
| 4,785,890 | 11/1988 | Martin | 111/52 X |
| 4,926,767 | 5/1990 | Thomas | 111/123 X |
| 5,129,282 | 7/1992 | Bassett et al. | 111/139 X |

FOREIGN PATENT DOCUMENTS

| | | | |
|---|---|---|---|
| 551372 | 12/1959 | Belgium | 111/120 |
| 530673 | 9/1956 | Canada | 111/124 |
| 335464 | 9/1921 | Germany | 111/124 |
| 1446674 | 3/1989 | Russian Federation | 111/124 |
| 1574412 | 9/1980 | United Kingdom | 111/123 |

*Primary Examiner*—Paul C. Lewis
*Attorney, Agent, or Firm*—Arnold, White & Durkee

[57] ABSTRACT

An apparatus for continuously planting seed in subjacent soil over which the apparatus traverses. The apparatus has a frame to be drawn by a towing vehicle, structure on the frame for resituating residue away from a row into which seed is to be deposited, structure on the frame for continuously parting soil as the apparatus is advanced in a direction of travel to define a seed slot, structure on the frame for continuously depositing seed in the seed slot, structure on the frame for continuously replacing soil in the seed slot to cover seed in the seed slot, and structure on the frame for continuously applying an additive to the soil between the residue resituating structure and the seed depositing structure. The invention is also directed to a method of planting and applying an additive.

6 Claims, 3 Drawing Sheets

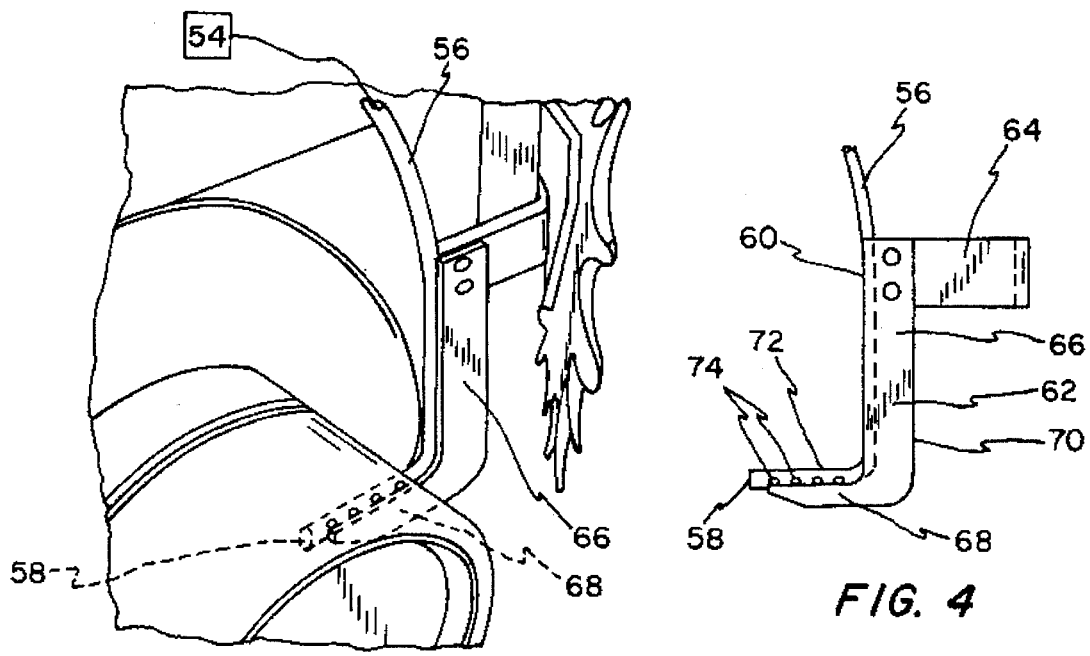
FIG. 3
FIG. 4
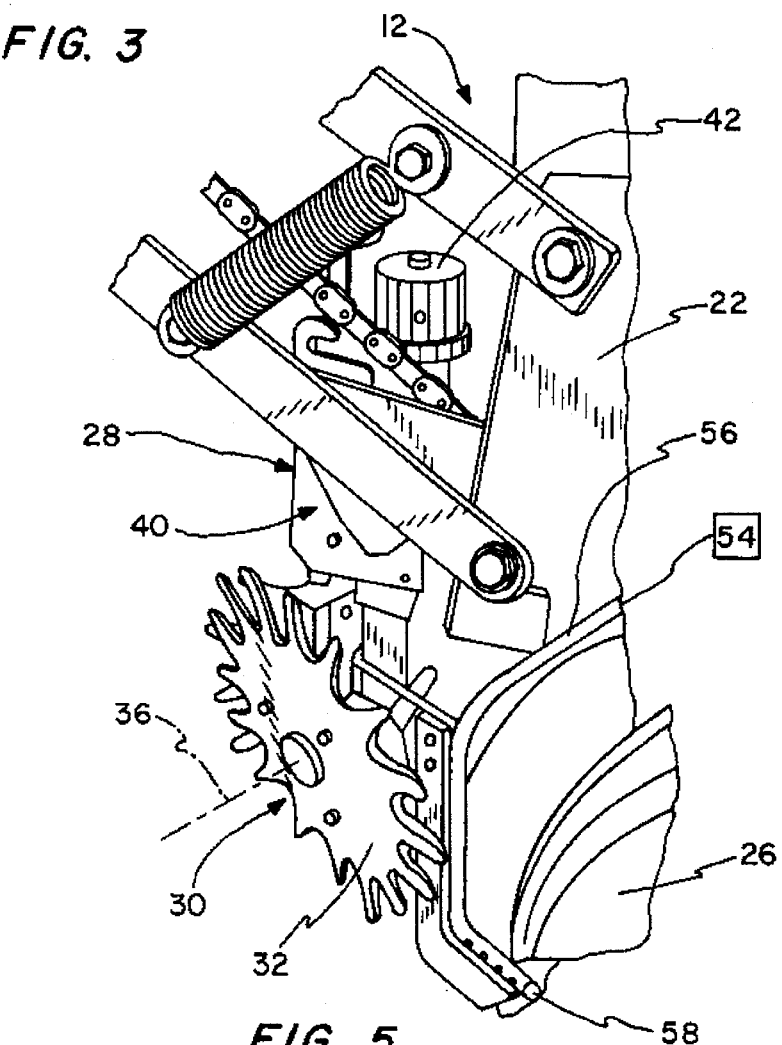
FIG. 5

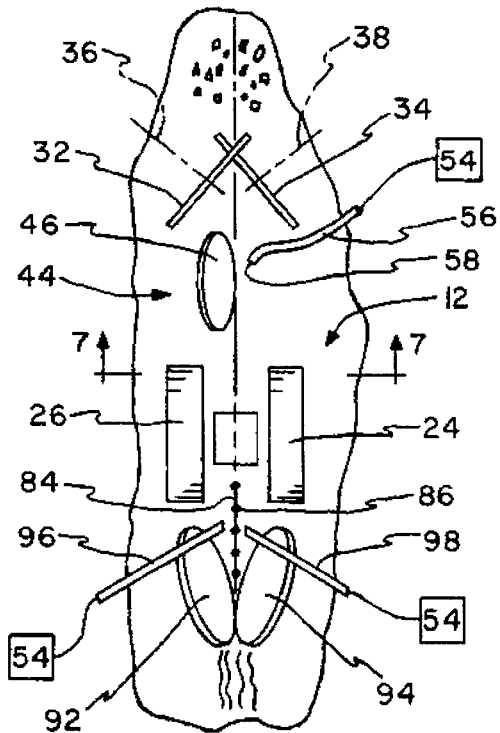
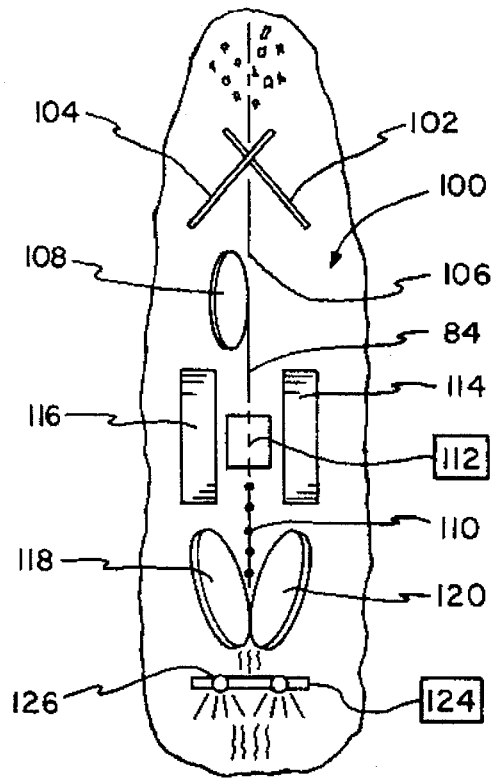
FIG. 6
FIG. 8 (PRIOR ART)
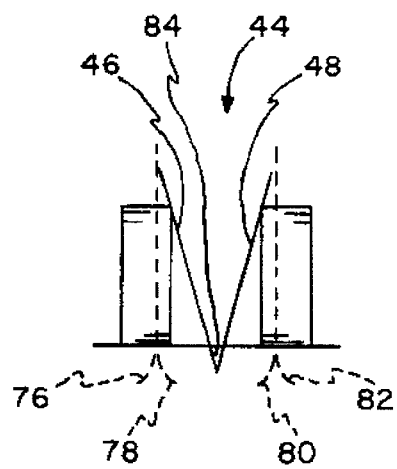
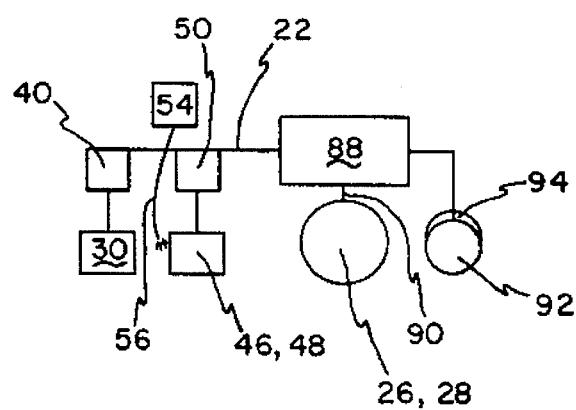
FIG. 7
FIG. 9

APPARATUS FOR CONTINUOUSLY PLANTING SEED AND APPLYING A SOIL ADDITIVE

CROSS REFERENCE

This application is a continuation-in-part of application Ser. No. 07/926,046, filed Aug. 5, 1992, now abandoned entitled "Apparatus for Continuously Planting Seed and Applying a Soil Additive".

BACKGROUND OF THE INVENTION

1. Field of the Invention

This invention relates to farming implements and, more particularly, to an apparatus for facilitating the continuous placement of seed in, and application of an additive to, soil. The invention also comprehends a method of soil treatment and seeding.

2. Background Art

In recent years there has been a trend away from the conventional method of planting and fertilizing fields. The conventional method is a multi-step process. First, the entire field is plowed by one or more passes of a cultivator unit. The prior year's residue is broken down and worked into the soil. The individual rows are eliminated so that the field has a generally homogeneous soil composition. Seed is planted and fertilizer applied in two additional, separate operations.

There are several drawbacks associated with conventional techniques. First of all, several passes over the field are normally required to adequately break up the soil and break down the residue and effect a mixing thereof. The cultivator unit must then be detached from a towing vehicle whereupon a planting unit can be substituted to be drawn by the towing vehicle. Interchange of implements can be difficult and time consuming. Further, the individual units are relatively expensive and must be separately stored when not in use and during the off season.

A further problem with this conventional technique is that the entire field is treated, whereas planting only occurs in a relatively small percentage of the area of a given field. As the entire field is plowed, there is substantial soil loss.

Recently, the federal government has decided to impose restrictions on the amount of ground cover that must be left in fields. Conventional techniques eliminate virtually all of the ground cover. It would be a prohibitive task to conventionally till the field and somehow replace the ground cover to comply with government regulations.

There have been many recent developments in no-till, min-till and ridge-till farming, which developments have been induced at least in part by ecological and economic considerations. These methods contemplate tilling of less than the entire field and maintaining ground cover in place on the field to thereby minimize erosion. These techniques allow soil preparation, seeding and fertilizing in a single pass over a field.

Normally, a plurality of planter units are drawn behind a vehicle in laterally spaced relationship. The planter units have at the leading end thereof a residue resituating structure, which may be a cooperating pair of toothed wheels. The wheels rotate to deposit residue on the sides of a row to be planted and at the same time pulverize and thereby aerate the soil in a planting row. Behind the residue resituating structure is a pair of Vee-opening wheels/disks which part the soil to define a seed slot. The seed is then deposited in the slot whereupon a pair of trailing closing wheels replace the soil in the slot.

With this latter structure, soil preparation and seeding can be accomplished with a single pass. In addition to planting the seed, it is also desirable to fertilize the soil in the vicinity of the seed. Typically, a starter fertilizer is deposited in the soil to quicken seed emergence and growth.

There are problems associated with known methods of applying fertilizer. For example, it is known to apply fertilizer at the leading portion of the planter unit. It is not uncommon for such planters to be devoid of any residue cleaning/resituating apparatus. The result is that much of the fertilizer is applied to the residue, rather than to the soil.

It is also known to apply the fertilizer directly into the seed slot. This direct application often results in an excessive amount of fertilizer being applied. If the seed is put in place before the application of the fertilizer, the fertilizer, which is applied under pressure, may undesirably resituate the seed. Also the seed may be damaged by direct contact with the fertilizer.

It is also known to spray the fertilizer at the trailing end of the planter unit. This often results in inadequate soil penetration by the fertilizer. High pressure spray application, to increase penetration, may resituate or altogether dislodge the seed.

SUMMARY OF THE INVENTION

The present invention is specifically directed to overcoming the above enumerated problems in a novel and simple manner.

More particularly, the invention contemplates an apparatus for continuously planting seed in subjacent soil over which the apparatus traverses. The apparatus has a frame to be drawn by a towing vehicle, structure on the frame for resituating residue away from a row into which seed is to be deposited, structure on the frame for continuously parting soil as the apparatus is advanced in a direction of travel to define a seed slot, structure on the frame for continuously depositing seed in the seed slot, structure on the frame for continuously replacing soil in the seed slot to cover seed in the seed slot, and structure on the frame for continuously applying an additive to the soil between the residue resituating structure and the seed depositing structure.

The additive is applied to soil that is cleared of residue so that substantially all the additive is applied to the soil rather than foreign matter such as crop residue, or the like. This maximizes coverage with the additive. Preferably, the additive is applied before the seed is directed into the seed slot to thereby avoid disturbing the location of the seed.

In one form, the frame carries gauge wheels, which maintain the frame at a desired height relative to subjacent soil. In a preferred form, the additive depositing structure is located between the residue resituating structure and the gauge wheels. The additive is preferably applied to the soil before compaction thereof by the gauge wheels. Accordingly, maximum penetration of the additive into the soil can be achieved.

The planting apparatus has a front and rear and laterally spaced sides. The invention contemplates the application of additive principally at at least one side of a seed slot defined by the soil parting structure. Even if the additive is applied with the slot open, there preferably is no direct spraying of the additive into the slot, which may or may not at that point have seed therein.

In one form, a knife is provided for penetrating the soil and a delivery conduit for the additive is provided behind at least a part of the knife. In one form, the knife has a leading edge and a trailing edge and the delivery conduit is located at least partially at the trailing edge of the knife to be shielded thereby.

In one form, the knife has an L-shaped configuration with a vertical leg and a horizontal leg, with the horizontal leg being angled laterally outwardly from a seed slot defined by the soil parting structure. In one form, the delivery conduit has a discharge end aligned to direct additive angularly inwardly toward/outwardly away from a seed slot defined by the soil parting means.

The additive can be applied at one or both sides of the seed slot.

In one form, the residue resituating structure is located in front of the soil parting structure and consists of a pair of meshing, rotary toothed wheels.

The residue resituating structure is preferably mounted to the frame for height adjustment. Similarly, the additive depositing structure can be mounted to the frame for controlled vertical movement. The invention contemplates that the residue resituating and additive depositing structures be mounted to the frame either to move vertically together or independently.

The invention further contemplates an apparatus for treating subjacent soil and having a frame to be drawn along subjacent soil and having a front and rear and laterally spaced sides, structure on the frame for continuously parting soil as the frame is advanced over subjacent soil in a direction of travel to define a seed slot, and structure for continuously depositing an additive in the soil adjacent to a seed slot without directing additive directly into the seed slot.

This arrangement avoids delivery of excessive amounts of additive to the seed slot and also prevents disturbing of the seeds in the event that the seed is in the seed slot at the time of additive application.

In one form, the additive depositing structure directs additive in at least two different directions on one side of the slot defined by the soil parting structure.

In one form, the additive depositing structure deposits additive on both sides of the slot defined by the soil parting structure.

The invention further contemplates the inclusion of structure on the frame for depositing seed in a seed slot from a first location on the apparatus and structure on the frame behind the first location for replacing soil in a seed slot. The additive depositing structure resides between the first location and the soil replacing structure.

The structure for depositing additive in this location can deposit the additive beneath the surface of soil treated by the apparatus.

In one form, a knife is included to penetrate subjacent soil with there being a delivery conduit on the knife for directing additive into the soil.

The additive depositing means can be constructed to deposit additive on both sides of a seed slot defined by the soil parting structure. In one form, the additive depositing structure does not deposit any of the additive directly into the open seed slot defined by the soil parting structure.

The apparatus may include a pair of gauge wheels for supporting the frame at a predetermined height, with the additive depositing structure residing between the gauge wheels and the soil replacing structure.

The invention further contemplates a method of continuously treating soil in a field by moving an apparatus in a single pass over subjacent soil in the field. The method includes the step of parting soil to define a seed slot, directing an additive into the soil on at least one side of the seed slot without directing additive directly into the seed slot, placing seed in the seed slot after the additive is directed into the soil, and replacing soil in the seed slot to cover seed in the seed slot.

The invention further contemplates the step of resituating foreign matter in the soil away from the path of where the seed slot is to be defined. In a preferred form, the soil is aerated at the same time that the foreign matter is resituated.

In one form, the additive is directed into the soil in a plurality of different directions on the one side of the seed slot.

The invention further contemplates a method of continuously treating soil by resituating foreign matter in the soil to define a clear path where a seed slot is to be defined, parting soil in the clean path to define a seed slot, placing seed in the seed slot, replacing soil in the seed slot to cover seed in the seed slot, and directing an additive into the soil in the clean path before replacing soil in the seed slot.

The method may further include the steps of supporting the apparatus on subjacent soil at a predetermined height, replacing soil in the seed slot, and directing an additive into the soil between the locations where the frame is supported on the soil and the soil is replaced in the seed slot.

The method may further include the step of directing additive into the soil beneath the surface of the soil at one or both sides of the seed slot. In one form, little or no additive is directed directly into the open seed slot.

BRIEF DESCRIPTION OF THE DRAWINGS

FIG. 3 is an enlarged, fragmentary, perspective view of an additive applying structure, according to the present invention, on the planter unit in FIG. 2;

FIG. 4 is an isolated side elevation view of a part of the additive applying structure of FIG. 3;

FIG. 5 is a fragmentary perspective view of the planter unit taken from the side opposite that in FIG. 2;

FIG. 6 is a schematic plan view of the planter of FIG. 2;

FIG. 7 is a cross-sectional view of gauge wheels and Vee opener wheels/disks on the planter assembly taken along line 7—7 of FIG. 6;

FIG. 8 is a schematic plan view of a prior art planter unit; and

FIG. 9 is a schematic side elevation view of a planter unit according to the present invention.

DETAILED DESCRIPTION OF THE DRAWINGS

Figure 1:
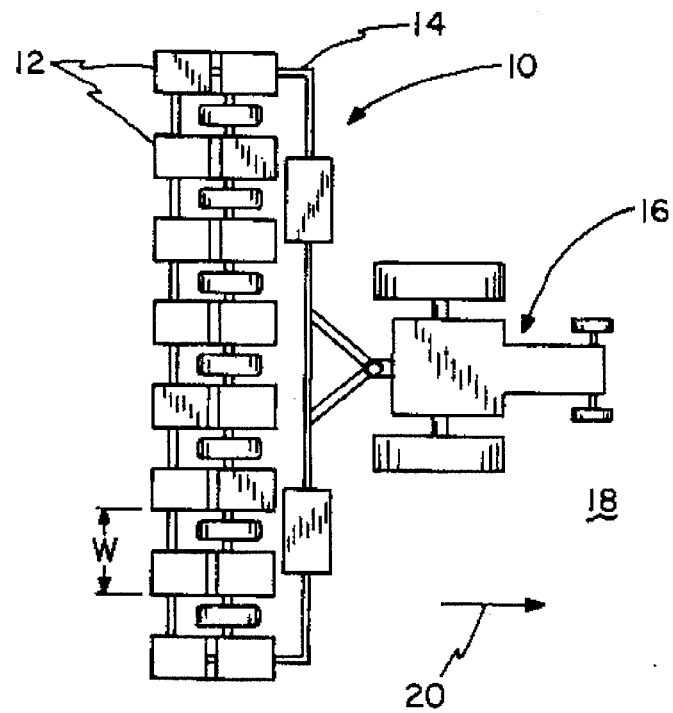
FIG. 1 is a schematic plan view of a towing vehicle drawing a frame with a plurality of planter units thereon and incorporating the present invention.
Figure 2:
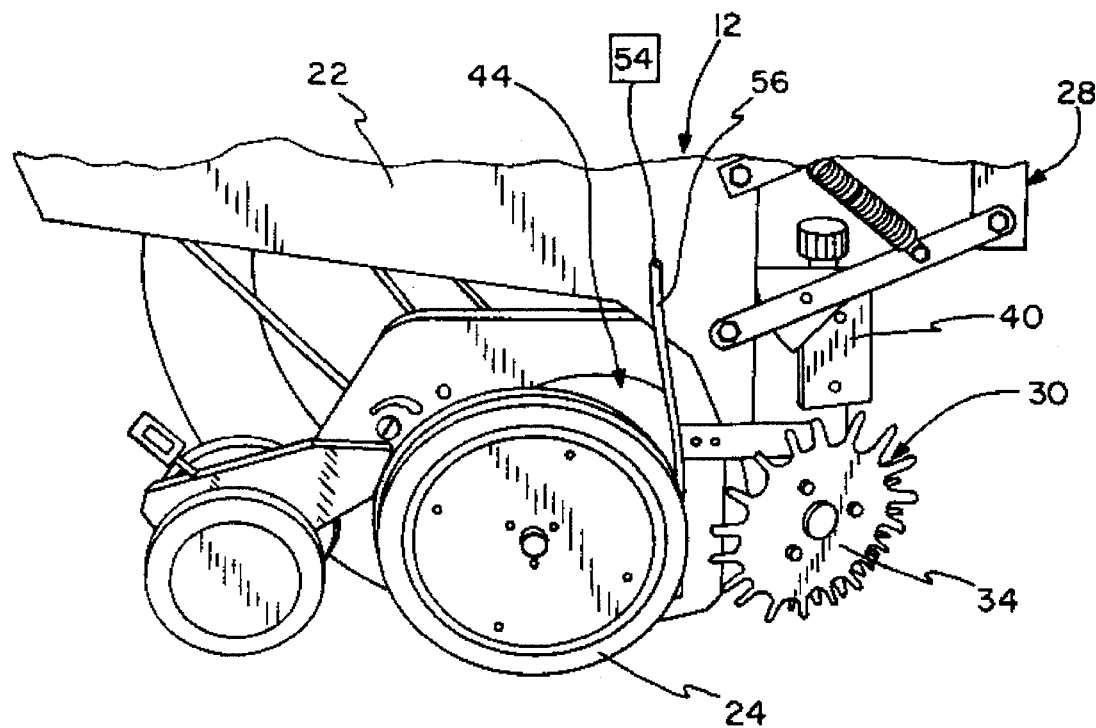
FIG. 2 is a fragmentary perspective view of one of the planter units incorporating the present invention.

In FIG. 1, a planting implement is shown schematically at 10. The planting implement 10 has a plurality of planter units 12 joined by a main frame 14 which is attached to and drawn by a towing vehicle 16 over a field 18 in the direction of arrow 20. The planter units 12 are spaced equidistantly in a lateral direction by an amount W, which corresponds to the spacing between adjacent rows in which seed is planted. The individual planter units 12 are constructed to clear residue in the row with which they are associated, plant seed, and apply an additive in a single pass.

More particularly, as seen in FIGS. 2—7 and 9, each planter unit 12 has a subframe 22 to which individual components are attached in accordance with the present invention. The frame 12 is supported in an elevated position by laterally spaced gauge wheels 24, 26, which facilitate movement of the associated planter unit 12 over the soil which it treats.

At the front/leading end 28 of the planter unit 12, a residue resituating mechanism 30 is provided. The residue resituating mechanism consists of a pair of toothed wheels 32, 34 which are in mesh, as seen in FIGS. 5 and 6. The wheels 32, 34 are toed inwardly at their bottom portions and diverge in a trailing direction. This orientation results in the wheels' rotating about their respective axes 36, 38 from forces induced by the soil as they are driven therethrough.

The wheels 32, 34 are carded by a bracket assembly 40, which is mounted to the frame 22 and permits height adjustment for the wheels 32, 34. This movement is imparted through an enlarged operating knob 42, which can be rotated to alter the height of the wheels 32, 34. The bracket assembly 40 is the subject of a separate application filed in the names of James H. Bassett and Robert E. Boyle, Jr., and entitled "Mechanism for Selectively Repositioning a Farm Implement", U.S. Ser. No. 735,298. This earlier application is incorporated herein by reference. However, the details of the bracket assembly 40 are peripheral to the present invention as there are different mechanisms currently known that are suitable to raise and lower farm implements.

The rotating wheels 32, 34 pulverize certain of the residue, which is typically from the prior year's crop, and pick up other residue and resituate it to the sides of the row in which seed is to be planted. At the same time, the wheels 32, 34 break up the soil, typically in about a 4–6 inch wide path. Consequently, the soil behind the wheels 32, 34 is clean and aerated.

Behind the wheels 32, 34 is a soil parting assembly 44. The soil parting assembly 44 consists of laterally spaced wheels/disks 46, 48, which are toed in at their bottom portions to define what is commonly referred to in the industry as a "Vee opener". The Vee opening wheels/disks 46, 48 are mounted to the frame 22 by suitable means 50, shown schematically in FIG. 9. The Vee opener wheels/disks 46, 48 are able to move freely through the loosened soil behind the wheels 32, 34 and part the soil in the wheels 32, 34 to define a seed slot.

An additive, which is normally a fertilizer, is delivered from a supply 54 carried by the frame 22 to a conduit 56, which has an outlet 58 through which the fertilizer discharges.

The conduit 56 is carded at the trailing edge 60 of an L-shaped knife 62 which penetrates the soil and provides a shield for the conduit 56. The knife 62 is supported on a bracket 64 on the frame 22 in depending fashion. The longer leg 66 of the knife 62 is substantially vertically oriented with a horizontal, shorter leg 68 projecting rearwardly therefrom. In one form, the leg 68, and conduit portion supported thereby, is inclined slightly downwardly from front to rear. The conduit 56 assumes a substantially conforming L-shape, as seen in FIGS. 3 and 4.

The leading edge 70 of the knife 62 first encounters the soil and produces a wedging action to immerse the trailing portion 72 of the conduit 56 in the soil. Fertilizer discharges through the outlet 58 and may also be discharged through a plurality of radially opening bores 74 in the conduit 56. The knife 62 has a configuration to allow the conduit portion 72 to be immersed in the soil as the planting implement 10 is advanced through a field without substantially disturbing the soil and without significant impedance to movement. Thus the fertilizer can be applied without significantly altering the row configuration.

The invention contemplates various discharge patterns for the additive/fertilizer. In FIG. 7, the conduit discharge ends 76, 78, 80, 82 are shown paired at opposite sides of a slot 84 defined by the wheels/disks 46, 48. The ends 78, 80 are directed downwardly and inwardly towards the slot 84, whereas the discharge ends 76, 82 are directed downwardly and away from the seed slot 84. The invention contemplates numerous different arrangements of conduits.

A particularly desirable feature of the inventive structure is that the additive/fertilizer is deposited in clean, loosened soil, at the side of the seed row for penetration into the soil. The additive/fertilizer does not have to be delivered directly into the slot, which might result in the application of excessive amounts of the additive/fertilizer directly onto the seed. Also, certain seeds may be sensitive to direct contact by an additive. Still further, the fertilizer is applied deeply into the soil without substantially disturbing the soil as might alter the ultimate seed position. Still further, the additive/fertilizer is applied to the soil close to the gauge wheels 24, 26 so that the additive/fertilizer is applied at a uniform depth. Otherwise, the depth of the additive/fertilizer application may vary considerably and undesirably over uneven terrain, resulting in fluctuation of crop quality. Preferably, the additive/fertilizer is applied no more than 10 inches, and preferably no more than 4 inches in front of the gauge wheels 24, 26.

Another problem with conventional additive applicators is overcome by the present invention. If an additive, such as anhydrous ammonia is delivered into the soil, it tends to be squeezed out of the soil under the pressure applied to the soil by the gauge wheels 24, 26. By applying the additive to the side of the seed row, less pressure is applied to the soil by the gauge wheels 24, 26.

The seed 86 is then delivered from a supply 88 continuously through a conduit 90 into the open seed slot 84. The mechanism for doing this is well known to those skilled in the agricultural art. The seed is typically delivered at a location between the gauge wheels 24, 26. After the seed 86 is deposited in the seed slot 84, angularly disposed press/closing wheels 92, 94 replace the soil in the seed slot to cover the seed therein.

With the inventive structure, described above, the user can make a single pass over a field and, in so doing, pulverize and resituate residue, clear and loosen the soil in the seed row, fertilize the soil adjacent to a seed slot, open the seed slot, deposit the seed, and replace the soil over the seed slot. A predetermined amount of fertilizer is added the soil adjacent to the seed slot without fear of placing excessive amounts of fertilizer on the seed or in the slot, or disturbing the seed location.

It has also been found to be advantageous to apply additive from the supply 54 at a location between the gauge wheels 24, 26 and the press/closing wheels 92, 94 as shown in FIG. 6. One or more means 96, 98 (two shown) are used to communicate additive from the supply 54 to the soil.

The means 96, 98 may have the same configuration as any of the various structures previously described. For example, each of the means 96, 98 may include a conduit such as the conduit 56, previously described, in conjunction with a knife, such as the knife 62, previously described.

The invention contemplates that the additive be applied at this location either on one or both sides of the seed slot 84. Preferably the additive is applied principally to the soil adjacent to the seed slot 84 so that no significant amount of additive is applied directly into the open seed slot.

FIG. 8 shows a prior art system at 100, in which numerous problems are encountered that are overcome by the present invention. Cooperating wheels 102, 104 resituate residue to the sides of the seed line 106. Vee opener wheels/disks 108 (one shown) part the soil upstream of the wheels 102, 104. Seed 110 from a supply 112 is deposited in the seed slot 84 between gauge wheels 114, 116. Press/closing wheels 118, 120 replace the soil in the slot 84 to cover the seed 110.

Additive is provided from a supply 124 through a spray mechanism 126 to the soil in front the press wheels 118, 120 onto the soil that is already closed over the slot 84. If the spray pressure is too low, ineffective penetration of the soil occurs. Additionally, the spray particles are prone to being either blown away or redirected to soft other than in the row. If the spray pressure is increased to increase penetration, there is a tendency of the spray to resituate or dislodge the seed, which is undesirable.

The foregoing disclosure of specific embodiments is intended to be illustrative of the broad concepts comprehended by the invention.

I claim:

1. An agricultural planter comprising a frame adapted to be towed by a tractor;

first and second laterally spaced gauge wheels on the frame for supporting the frame at a predetermined operating height relative to subjacent soil on which the gauge wheels bear;

residue-relocating means mounted on the frame in front of the gauge wheels for resituating residue laterally away from a seed line extending between the gauge wheels;

a soil-parting device mounted on the frame behind the toothed wheels and adjacent the gauge wheels for parting subjacent soil to form a seed slot in the soil along the seed line;

a seed-depositing device mounted on the frame for depositing seed in the seed slot;

a soil-closing device mounted on the frame behind the seed-depositing device and the gauge wheels for closing the seed slot to cover the seeds deposited therein; and a fertilizer knife mounted on the frame behind the seed-depositing device and the gauge wheels, and in front of the soil-closing device, for cutting a fertilizer slot in the soil and depositing fertilizer in the slot, said fertilizer slot being laterally spaced away from said seed slot.

2. The agricultural planter of claim 1 which includes a pair of said fertilizer knives located on opposite sides of said seed slot.

3. The agricultural planter of claim 1 wherein said residue-relocating means comprises at least one toothed wheel.

4. The agricultural planter of claim 1 wherein said fertilizer knife includes a fertilizer conduit with an end portion that travels beneath the upper surface of subjacent soil in which the fertilizer slot is formed.

5. The agricultural planter of claim 1 wherein said soil-parting device comprises a pair of discs canted so that they cut a V-shaped seed slot in the soil.

6. The agricultural planter of claim 1 wherein said soil-closing device comprises a pair of cooperating closing wheels.

* * * * *